United States Patent [19]

Cole et al.

[11] 3,824,788

[45] July 23, 1974

[54] INTERNAL COMBUSTION ENGINE AND METHOD OF OPERATION FOR EXHAUST EMISSION CONTROL

[75] Inventors: Edward N. Cole, Bloomfield Hills; George W. Niepoth, Milford, both of Mich.

[73] Assignee: General Motors Corporation, Detroit, Mich.

[22] Filed: Dec. 6, 1972

[21] Appl. No.: 312,574

Related U.S. Application Data

[63] Continuation-in-part of Ser. No. 247,569, April 26, 1972, abandoned.

[52] U.S. Cl. ............... 60/274, 60/284, 60/285, 60/288, 60/290, 60/301, 23/288 F, 423/213.7
[51] Int. Cl. ............... F02b 75/10, F01n 3/14
[58] Field of Search .............. 60/274, 285, 284, 288, 60/289, 290, 301, 306; 23/288 F; 423/213, 214, 213.7; 123/122 AB

[56] References Cited
UNITED STATES PATENTS

| | | | |
|---|---|---|---|
| 3,180,712 | 4/1965 | Hamblin | 60/289 |
| 3,406,515 | 10/1968 | Behrens | 23/288 F |
| 3,440,817 | 4/1969 | Saufferer | 60/288 |
| 3,581,490 | 6/1971 | Morris | 23/288 F |
| 3,662,540 | 5/1972 | Murphey | 60/299 |
| 3,717,131 | 2/1973 | Chana | 123/122 AB |
| 3,733,181 | 5/1973 | Tourtellotte | 423/213 |
| 3,740,197 | 6/1973 | Scheitlin | 60/301 |
| 3,757,521 | 9/1973 | Tourtellotte | 60/301 |

*Primary Examiner*—Douglas Hart
*Attorney, Agent, or Firm*—C. K. Veenstra

[57] ABSTRACT

A V-8 internal combustion engine with an inlet manifold disposed between the banks of cylinders and a pair of exhaust manifolds disposed outboard of the banks of cylinders has a converter unit containing reducing and oxidizing catalyst beds coupled to each exhaust manifold. During a warm-up mode, exhaust gases from both banks of cylinders pass through a heat exchange region beneath the inlet manifold and then enter the conveyor units and pass through the catalyst beds. Air injected at the exhaust ports during the warm-up mode supports oxidation of hydrocarbons and carbon monoxide, and the hot exhaust gases promote evaporation of fuel in the inlet manifold and heat the catalyst beds. After the warm-up mode, a converter mode is entered in which exhaust gases are discharged from the exhaust manifolds directly into the converter units and pass through the catalyst beds. A reducing atmosphere provided in the first catalyst bed during the converter mode supports dissociation of oxides of nitrogen, and air injected between the catalyst beds provides an oxidizing atmosphere to support oxidization of hydrocarbons and carbon monoxide in the second catalyst bed. At high speeds or temperatures, a reactor mode is entered in which air injected at the exhaust ports supports oxidation of hydrocarbons and carbon monoxide in the exhaust manifolds and the exhaust gases then are discharged from the exhaust manifolds directly to the exhaust pipes to protect the catalyst beds.

21 Claims, 10 Drawing Figures

INTERNAL COMBUSTION ENGINE AND METHOD OF OPERATION FOR EXHAUST EMISSION CONTROL

This is a continuation-in-part of Ser. No. 247,569, filed Apr. 26, 1972 and now abandoned.

This invention relates to the control of exhaust emissions from an internal combustion engine.

Recent work suggests that emission of hydrocarbons, carbon monoxide, and oxides of nitrogen in internal combustion engine exhaust gases may be controlled to low levels when the exhaust gases are delivered in a reducing atmosphere through a catalyst bed for dissociation of oxides of nitrogen and then in an oxidizing atmosphere through another catalyst bed for oxidation of hydrocarbons and carbon monoxide. However, such a control approach is not efficient until the catalyst beds have been heated to an elevated temperature. To accomplish this, the catalyst beds have been disposed in a retroverted flow converter unit coupled closely to the engine exhaust manifold for heating by the exhaust gases. In a V-type engine with a pair of exhaust manifolds, two converter units may be used, one coupled to each exhaust manifold.

Other work suggests that the time required to heat the catalyst beds may be reduced even further by injecting air into the combustion chamber exhaust ports, rather than between the catalyst beds, during the warm-up mode. The air supports an oxidizing reaction in the exhaust gases, and the heat released during the reaction promotes heating of the catalyst beds. After the beds have reached the necessary temperature, the air flow to the exhaust ports is partially or completely cut off if necessary to provide a reducing atmosphere in the first catalyst bed and air is added to the exhaust gases leaving the first bed to provide an oxidizing atmosphere in the second bed.

Additional work suggests that more complete control of exhaust emissions may be achieved with a catalytic converter unit by rapidly heating a portion of the inlet manifold during the warm-up mode. This promotes evaporation of the fuel in the air-fuel mixture received from the carburetor and thereby permits leaner carburetion — and the more rapidly the inlet manifold is heated, the sooner the carburetor choke may be opened for leaner operation. However, the usual inlet manifold heating arrangement, which in a V-type engine directs the exhaust gases from one exhaust manifold through a heat exchange region beneath the inlet manifold to the other exhaust manifold, does not heat the inlet manifold as rapidly as may be desired. In addition, the use of such a heating arrangement on a V-type engine having a pair of exhaust manifolds and a catalytic converter unit coupled to each exhaust manifold would prevent exhaust heat from reaching one of the converter units during the warm-up mode and thus efficient operation of that converter unit would be delayed.

With this invention, an internal combustion engine and a method of operating the engine are provided which combine the advantages of each concept. Where it is desired to promote the most rapid heating of the inlet manifold, a highly efficient heat exchange region is provided which receives exhaust gases from all of the combustion chambers. In a V-type engine having a pair of exhaust manifolds, two catalytic converter units are provided, each coupled directly to one of the exhaust manifolds for rapid heating. During the warm-up mode, exhaust gases are routed through the inlet manifold heat exchange region to the converter units. Air is injected at the combustion chamber exhaust ports during the warm-up mode; this supports an oxidizing reaction in the exhaust gases for control of hydrocarbon and carbon monoxide emissions and also increases the exhaust gas temperature resulting in faster heating of the inlet manifold and the converter units. Each converter unit has a reducing portion for dissociation of oxides of nitrogen and an oxidizing portion for oxidation of hydrocarbons and carbon monoxide. During the converter mode, each converter unit receives exhaust gases directly from one of the exhaust manifolds, and air flow to the combustion chamber exhaust ports is reduced or cut-off if necessary to provide a reducing atmosphere in the reducing portions of the converter units. Air is injected between the reducing and oxidizing portions of the converter units to provide an oxidizing atmosphere in the oxidizing portions.

While the foregoing construction and method of operation are highly effective in minimizing undesired exhaust emissions, the converter units generally must be protected against high temperatures which can be created by the exothermic reducing and oxidizing reactions which they promote. Prior proposals suggest by-passing of the converter units during a high temperature mode of operation but provide no alternative control for the emissions which are produced during such a mode of operation.

The invention shown herein further provides for the protection of the converter units during high temperature modes of operation while simultaneously providing effective emission control. At such times, air is injected into the combustion chamber exhaust ports to ro-ote oxidation of hydrocarbons and carbon monoxide in the exhaust manifolds which thus serve as exhaust manifold reactors. The treated exhaust gases then are discharged directly to the exhaust pipes to protect the converter units against excessive temperature conditions.

Preferably, this reactor mode of operation also is employed at the high speeds which are used for cruising. It has been found that emissions are controlled to low levels in the reactor mode during high speed operation, and it is expected that the effective life of the catalyst will be prolonged by avoiding the flow of exhaust gases through the converter units at high rates over extended periods.

During the converter mode of operation, the carburetor must supply an air-fuel mixture which is richer than stoichiometric to provide a reducing atmosphere in the reducing portion of the converter unit. However, during the reactor mode of operation, when emissions are controlled in the manifold reactors rather than in the catalytic converter units, it may be desirable for the carburetor to supply an air-fuel ratio which is leaner than stoichiometric. This would improve fuel economy, reduce the combustibles which must be treated in the manifold reactors, and provide part or all of the oxidizing atmosphere in the reactors.

It may be seen, therefore, that three modes of operation are provided: in the warm-up mode, which may take about one minute, air is injected at the combustion chamber exhaust ports to promote an oxidizing reaction in the exhaust gases, and the exhaust gases then are directed through the catalytic converter units (generally after heating the inlet manifold) to heat the converter units. In the converter mode, exhaust gases are directed to the converter units and pass in a reducing atmosphere through a portion having a reducing catalyst, air is injected into the exhaust gases leaving the reducing portion, and the exhaust gases then pass in an oxidizing atmosphere through a portion having an oxidizing catalyst. In the reactor mode, air is injected at the combustion chamber exhaust ports to support an oxidizing reaction in the exhaust manifold reactors, and exhaust gas flow through the converter units is avoided to protect the catalyst.

It will be appreciated, of course, that while this invention is depicted as it may be embodied in one V-type engine, it is readily adaptable for use in other V-type engines, in in-line engines, and in rotary engines.

The details as well as other advantages of this invention are set forth in the remainder of the specification and in the drawings in which.

Figure 1:
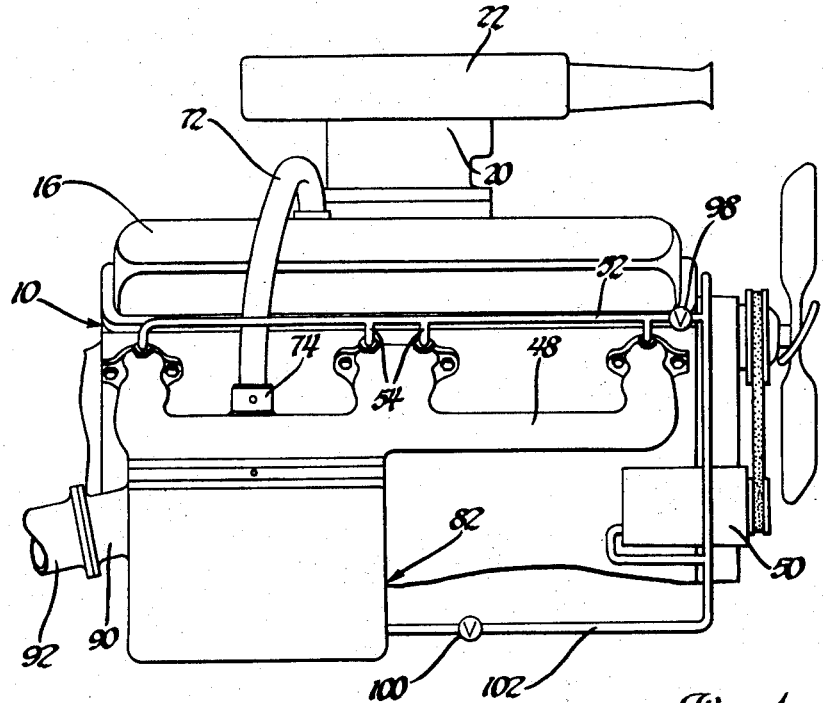
FIG. 1 is a side elevational view of an internal combustion engine embodying this invention, showing an exhaust manifold and a converter unit, a pipe for conducting exhaust gases from the inlet manifold heat exchange region to the converter unit, and the air injection pump.

Referring to the drawings, a V-8 engine 10 has a plurality of combustion chambers 12 arranged in left- and right-hand banks 14 and 16 respectively. An inlet manifold 18 is disposed between banks 14 and 16 and is adapted to receive a carburetor 20 and an air cleaner 22.

Figure 2:
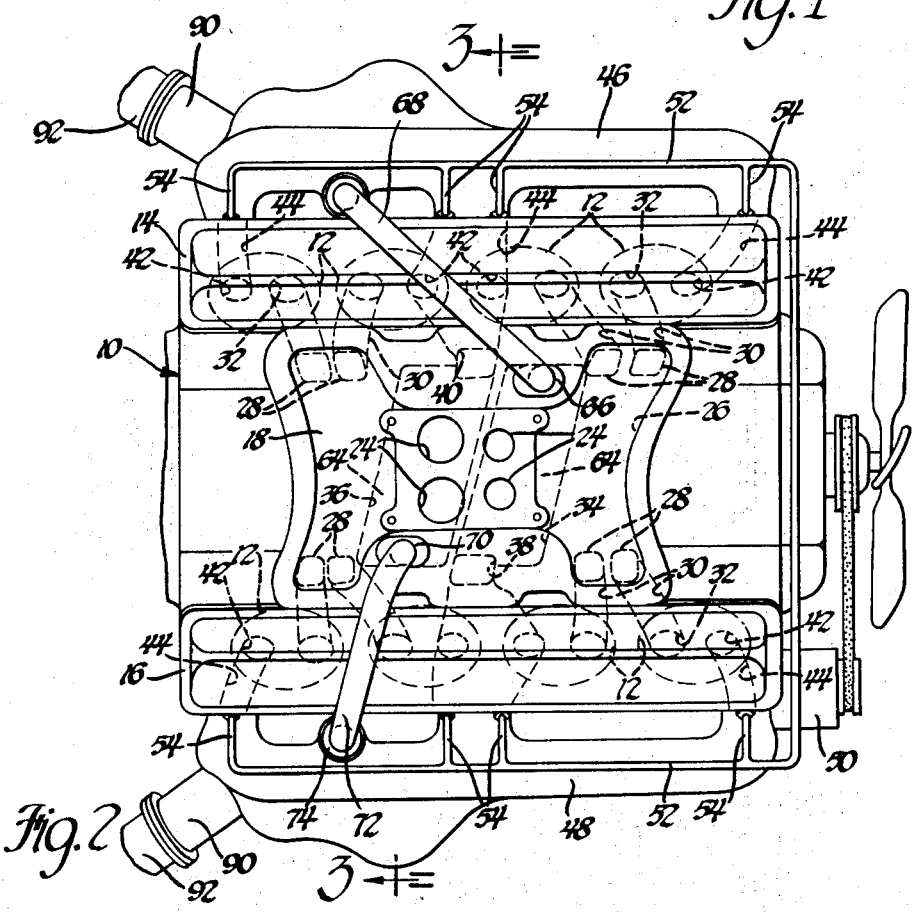
FIG. 2 is a top plan view of the engine of FIG. 1, the air cleaner and carburetor having been removed, showing the combustion chamber inlet and exhaust ports and passages, the inlet manifold heat exchange region, and the pipes for conducting exhaust gases from the heat exchange region to the converter units.
Figure 3:
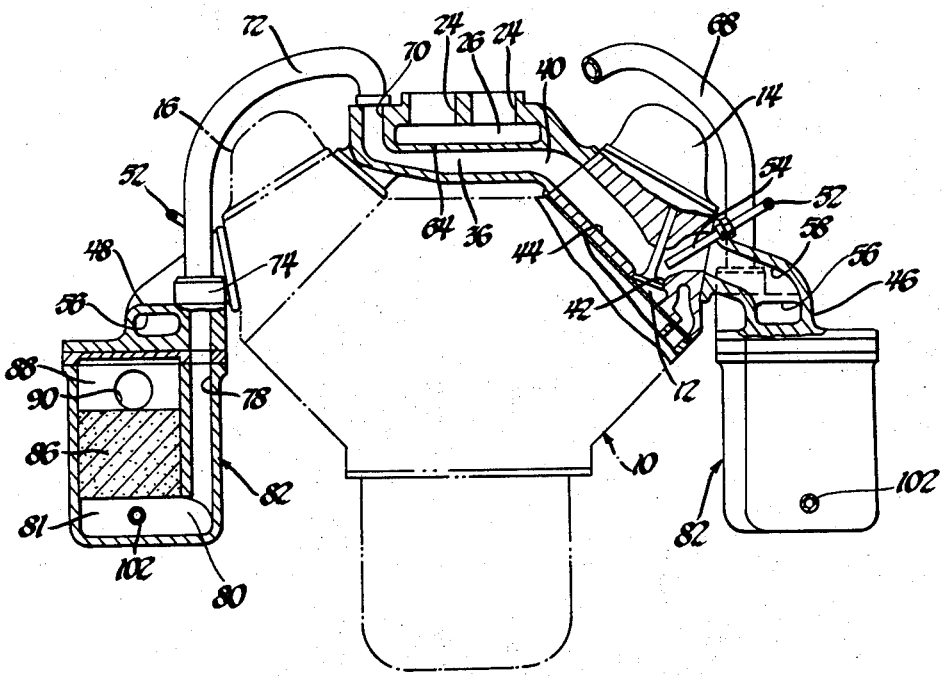
FIG. 3 is a sectional view taken along line 3—3 of FIG. 2, schematically showing a combustion chamber, an air injection tube, the exhaust manifolds and converter units, one of the exhaust crossover passages providing the heat exchange region, and the pipes leading from the crossover passages to the converter units.

In the embodiment shown, inlet manifold 18 is a single level manifold having a plurality of riser bores 24 for delivering an air-fuel mixture from carburetor 20 to a common induction plenum 26 shown in FIG. 3. A plurality of outlets 28 open from plenum 26 through individual induction passages 30 to the inlet ports 32 for combustion chambers 12 as shown in FIG. 2.

Inlet manifold 18 also has a pair of exhaust gas crossover passages 34 and 36 below plenum 26. The forward crossover passage 34 has an inlet 38 receiving exhaust gases from right bank 16, and the rear crossover passage 36 has an inlet 40 receiving exhaust gases from left bank 14.

The exhaust ports 42 open from combustion chambers 12 through exhaust passages 44 to left- and right-hand exhaust manifolds 46 and 48 respectively.

An air pump 50 delivers air through distribution pipes 52 to injection tubes 54 which, as shown in FIG. 3, extend into exhaust passages 44 closely adjacent exhaust ports 42 to discharge air into the exhaust gases issued from exhaust ports 42.

Figure 4:
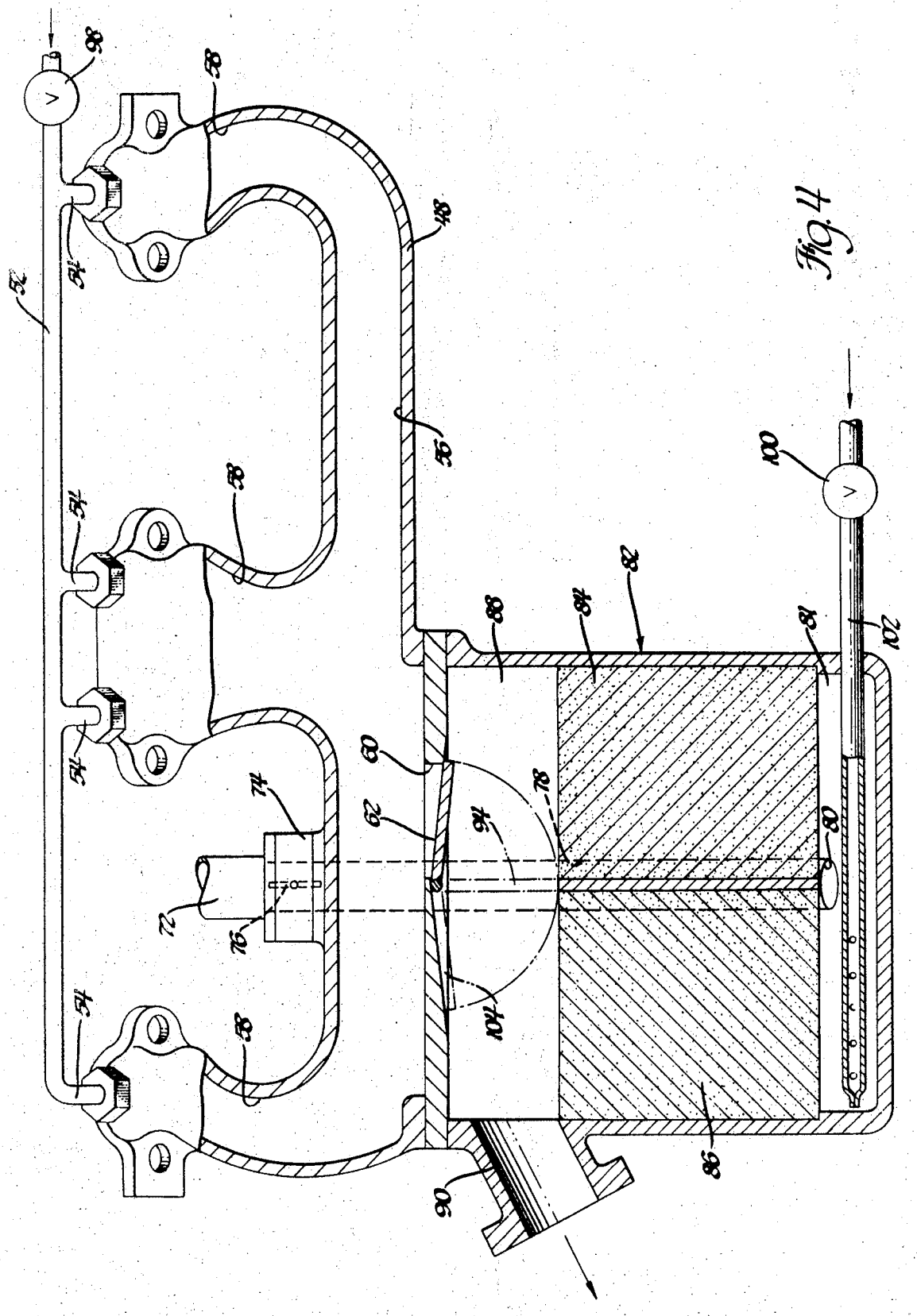
FIG. 4 is an enlarged view of a portion of FIG. 1 with parts of the exhaust manifold and converter unit broken away to exemplify the construction.

As shown in FIG. 4, each exhaust manifold has an exhaust plenum 56 which receives exhaust gases through legs 58 from exhaust passages 44. An outlet 60 at the bottom of plenum 56 is controlled by a valve 62. With valve 62 in the position shown, exhaust gases from the forward and rear legs 58 are directed through exhaust plenum 56 to the central leg 58. Thus exhaust gases from the forward and rear combustion chambers 12 of right bank 16 are forced past the exhaust ports 42 for the central combustion chambers 12 of right bank 16 and together with exhaust gases from the central combustion chambers 12 of right bank 16, are forced into inlet 38 and through forward crossover passage 34. Similarly, exhaust gases from the forward and rear combustion chambers 12 of left bank 14 are forced past the exhaust ports 42 for the central combustion chambers 12 of left bank 14 and together with exhaust gases from the central combustion chambers 12 of left bank 14 are forced into inlet 40 and through rear crossover passage 36.

Air supplied by pump 50 through distribution pipes 52 and injection tubes 54 promotes oxidation of hydrocarbons and carbon monoxide in the exhaust gases. Heat released from the oxidizing reaction is transmitted through the heat transfer surface 64 between exhaust gas crossover passages 34 and 36 and induction plenum 26 and promotes evaporation of the fuel in the air-fuel mixture received by inlet manifold 18 from carburetor 20. Preferably, heat transfer surface 64 comprises a sheet metal member cast or bolted in place. Fins also may be employed on surface 64 to improve heat exchange, and the flow area of crossover passages 34 and 36 may be kept small to provide high exhaust gas flow velocities past heat transfer surface 64.

Exhaust crossover passage 34 has an outlet 66 opening through a pipe 68, and exhaust crossover passage 36 has an outlet 70 opening through a pipe 72. A valve housing 74 containing a crossover or manifold heat valve 76 may be disposed at the end of pipe 72, and a similar valve housing and manifold heat valve may be disposed at the end of pipe 68. It will be appreciated that, in some circumstances, a unitary construction may be employed for housing both valves 62 and 76.

On each side of engine 10, a passage 78 extends from pipe 72 (or 68) and opens at 80 into the lower chamber 81 of a converter unit 82. Exhaust gases discharged from passage 78 flow upwardly through a pair of catalyst beds 84 and 86 to the upper chamber 88 of converter unit 82 and then through an outlet 90 to an exhaust pipe 92. The heat released through oxidation of exhaust gas constituents by the air injected from tubes 54 promotes heating of catalyst beds 84 and 86, and the parallel flow path of exhaust gases through catalyst beds 84 and 86 assures simultaneous heating of the beds.

After a period of time, valve 62 is opened from the position shown to the position indicated by the dotted lines 94. Exhaust gases then may flow directly from exhaust manifold plenum 56 through opening 60 into upper chamber 88 of converter unit 82 above catalyst bed 84, downwardly through catalyst bed 84 into lower chamber 81 of converter unit 82, upwardly through catalyst bed 86 back to upper chamber 88, and then through outlet 90 to exhaust pipe 92. At the same time, or at some time thereafter, valve 76 may be partially or fully closed if desired. And at the same time that valve 62 is opened to position 94, or at some time thereafter, a valve 98 is partially or fully closed to reduce or prevent distribution of air from pump 50 through distribution pipe 52 if necessary to provide a reducing atmosphere in catalyst bed 84, and a valve 100 is opened to permit air flow from pump 50 through a pipe 102 into lower chamber 81 of converter unit 82 below catalyst bed 86.

The precise timing selected for the aforementioned operation of valves 62, 76, 98, and 100 will be dependent upon the efficiency of heat transfer surfaces 64 and catalyst beds 84 and 86 at various temperatures and the rate at which they are heated. In some circumstances all valves may be actuated simultaneously; in other circumstances it may be desired to open valve 62 to permit flow directly from plenum 56 through the catalyst beds before closing manifold heat valve 76 and/or air valve 98.

With proper calibration of carburetor 20, exhaust gases produced by combustion chambers 12 issue from exhaust ports 42 in a reducing atmosphere. By partially or fully closing valve 98 to provide any necessary reduction in air flow through distribution pipes 52 and injection tubes 54, the exhaust gases reach catalyst bed 84 in a reducing atmosphere and bed 84 promotes dissociation of oxides of nitrogen in the exhaust gases. When the exhaust gases enter lower chamber 81 of converter unit 82, air is injected through pipe 102 to provide an oxidizing atmosphere. The gases then pass upwardly through catalyst bed 86 which promotes oxidation of hydrocarbons and carbon monoxide in the exhaust gases. In some instances, catalyst bed 86 may not be necessary to effect the oxidizing reaction.

From the foregoing, it will be appreciated that the engine is operated in a highly efficient manner during warm-up both to heat inlet manifold 18, where desirable to promote evaporation of fuel so that the carburetion may be leaned as soon as possible, and to heat catalyst beds 84 and 86 so that the catalytic reactions may begin as soon as possible. At the same time, an oxidizing atmosphere is provided for oxidation of hydrocarbons and carbon monoxide which are emitted in the greatest concentrations during the warm-up period. As soon as practicable, usually in about one minute, the system is switched from the warm-up mode to a converter mode in which both dissociation of oxides of nitrogen and oxidation of hydrocarbons and carbon monoxide is provided.

Should an overtemperature condition occur, valve 62 may be moved from position 94 to the position indicated by the dotted lines 104. Exhaust gases then may flow directly from exhaust manifold plenum 56 through upper chamber 88 of converter housing 82 to outlet 90, avoiding catalyst beds 84 and 86. At the same time, valve 98 may be opened so that air pump 50 may supply air through distribution pipes 52 and injection tubes 54 to exhaust ports 42. In this manner oxidation of hydrocarbons and carbon monoxide is continued in exhaust manifold 48, which thus serves as an exhaust manifold reactor, while at the same time catalyst beds 84 and 86 begin to cool. In some circumstances valve 100 may be left open to permit air flow through pipe 102 to beds 84 and 86 for cooling purposes; under other circumstances, it may be desirable to close valve 100 so that the air flow does not promote oxidation of hydrocarbons and carbon monoxide remaining in catalyst beds 84 and 86.

Under some circumstances, such as during high speed cruise periods when emission of oxides of nitrogen is low, it is desirable to move valve 62 to position 104 to permit the exhaust gases to avoid catalyst beds 84 and 86; this prevents overheating of the beds and also is expected to prolong the effective life of the catalyst by avoiding the flow of exhaust gases through the converter unit at high rates over extended periods. Oxidation of hydrocarbons and carbon monoxide is continued in manifold reactor 48 at such times by opening valve 98 to permit air flow from pump 50 through distribution pipes 52 and injection tubes 54.

A specific mechanism for operation of the valves shown in FIG. 4 has not been depicted since many satisfactory mechanisms are available in the art. As one suggestion, vacuum motors may be employed to actuate the valves, the vacuum supply to the valves being regulated by a solenoid control which is energized by a sensor circuit responsive to control parameters such as temperatures in one of the converter units or other engine temperatures and engine or vehicle speed. Other operating mechanisms and control parameters will be apparent to those skilled in the art: for example, it may be preferable to operate in the reactor mode rather than the converter mode during deceleration and coasting conditions; control parameters such as manifold vacuum or throttle position and engine speed would be advantageous under these conditions.

Figure 5:
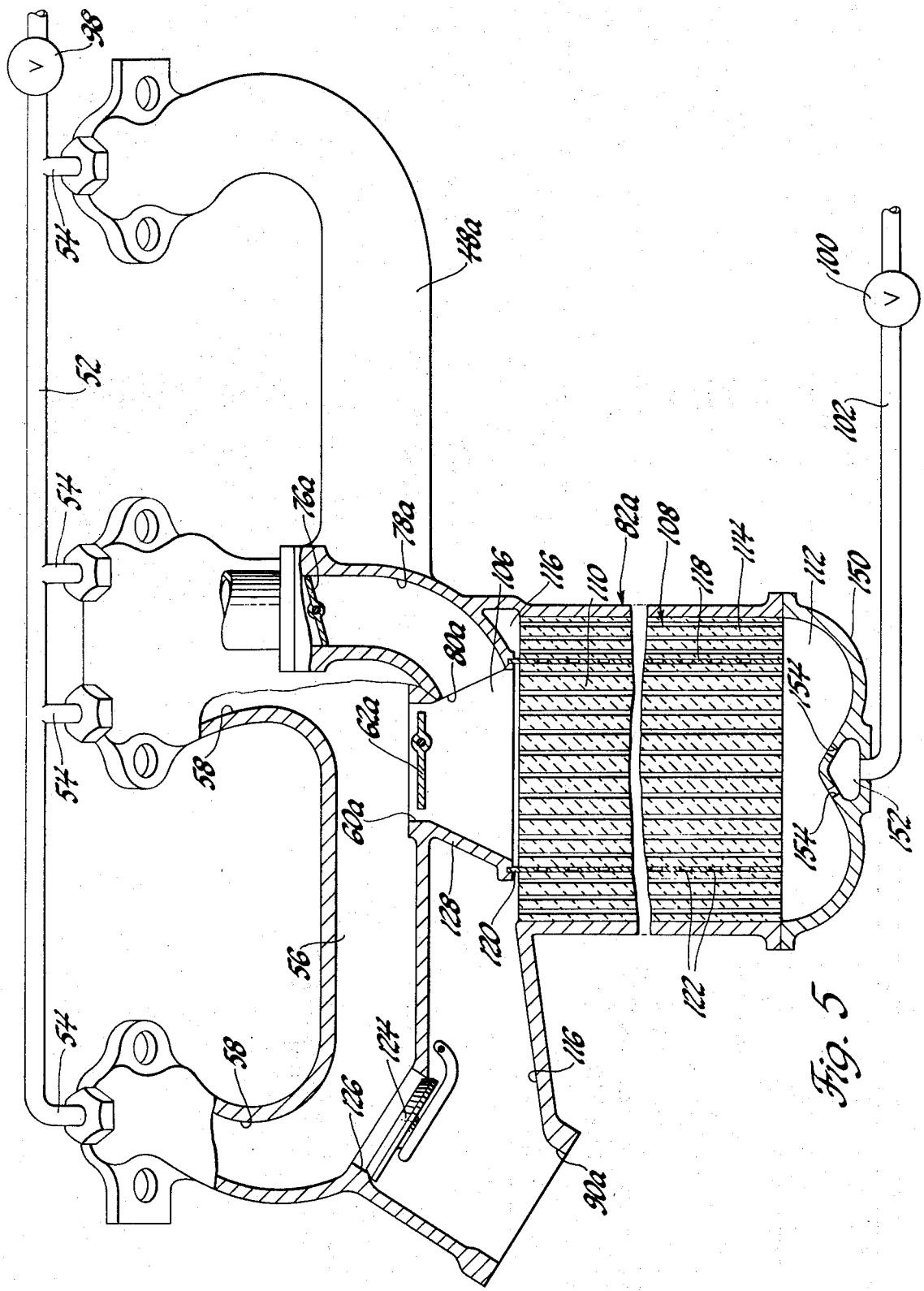
FIG. 5 is a view similar to FIG. 4 showing an alternative embodiment of the exhaust manifold and converter unit.

An alternative embodiment of the exhaust manifold and converter unit is shown in FIG. 5. In this embodiment, an exhaust manifold 48a has an exhaust plenum 56 which receives exhaust gases through legs 58 from exhaust passages 44. An opening 60a at the bottom of plenum 56 is controlled by a converter valve 62a. With converter valve 62a in the position shown, exhaust gases from the forward and rear legs 58 are directed through exhaust plenum 56 to the central leg 58. Thus exhaust gases from the forward and rear combustion chambers 12 of right bank 16 are forced past the exhaust ports 42 for the central combustion chambers 12 of right bank 16 and together with exhaust gases from the central combustion chambers 12 of right bank 16, are forced into inlet 38 and through forward crossover passage 34. Similarly, exhaust gases from the forward and rear combustion chambers 12 of left bank 14 are forced past the exhaust ports 42 for the central combustion chambers 12 of left bank 14 and together with exhaust gases from the central combustion chambers 12 of left bank 14 are forced into inlet 40 and through rear crossover passage 36.

One each side of engine 10, a passage 78a extends from pipe 72 (or 68) and opens at 80a into the upper region 106 of a converter unit 82a. A monolithic catalyst package 108 is mounted in converter unit 82a and is shown here as having a cylindrical configuration. The inner portion 110 of monolith 108 receives exhaust gases from region 106 and directs the exhaust gases downwardly to the lower region 112 of converter unit 82a. The exhaust gases then flow upwardly through the outer portion 114 of monolith 108 to a discharge plenum 116 and then through an outlet 90a to exhaust pipe 92. The heat released through oxidation of exhaust gas constituents by the air injected from tubes 54 promotes heating of monolith 108 which in turn, in the presence of an oxidizing atmosphere, promotes further oxidation of the exhaust gases.

It will be appreciated that converter valve 62a does not necessarily seal opening 60a but instead may permit some flow of exhaust gas directly from exhaust plenum 56 through opening 60a to monolith 108 for faster heating of the monolith.

After a period of time, converter valve 62a is opened from the position shown. Exhaust gases then flow directly from exhaust manifold plenum 56 through opening 60a into upper region 106 of converter unit 82a above inner portion 110, downwardly through inner portion 110 into lower region 112 of converter unit 82a, upwardly through outer portion 114 to discharge plenum 116, and then through outlet 90a to exhaust pipe 92. At the same time, or at some time thereafter, manifold heat valve 76a may be partially or fully closed if desired. And at the same time that converter valve 62a is opened, or at some time thereafter, valve 98 is partially or fully closed to reduce or prevent distribution of air from pump 50 through distribution pipe 52 if necessary to provide a reducing atmosphere in inner portion 110, and valve 100 is opened to permit air flow from pump 50 through pipe 102 into lower region 112 of converter unit 82a below outer portion 114.

With proper calibration of carburetor 20, exhaust gases produced by combustion chambers 12 issue from exhaust ports 42 in a reducing atmosphere. By partially or fully closing valve 98 to provide any necessary reduction in air flow through distribution pipes 52 and injection tubes 54, the exhaust gases reach inner portion 110 of monolithic catalyst package 108 in a reducing atmosphere and inner portion 110 promotes dissociation of oxides of nitrogen in the exhaust gases. When the exhaust gases enter lower region 112 of converter unit 82a, air is injected through pipe 102 to provide an oxidizing atmosphere. The gases then pass upwardly through outer portion 114 of monolith 108 which promotes oxidation of hydrocarbons and carbon monoxide in the exhaust gases.

Monolith 108 may be formed in a variety of ways — extrusion being one well-known technique — whereby a series of vertically oriented passages are provided through inner portion 110 from upper region 106 to lower region 112 and through outer portion 114 from lower region 112 to discharge plenum 116. With such, no partition is required between inner and outer portions 110 and 114 of monolith 108; once axial flow is induced into inner portion 110, the monolithic material prevents lateral diffusion and short circuiting into outer portion 114.

As shown in FIG. 5, a perforated tube 118 may be imbedded in monolith 108. The upper portion 120 of tube 118 may be utilized to direct exhaust gases from upper region 106 into inner portion 110 of monolith 108, and the remainder of tube 118, having the monolithic material extending through the perforations 122, may be utilized to support monolith 108.

When operating under high speed or high temperature conditions, converter valve 62a is again closed to the position indicated and a reactor valve 124 is opened to permit flow through an opening 126 at the end of plenum 56. Exhaust gases then flow directly from exhaust manifold plenum 56 through discharge plenum 116 to outlet 90a, avoiding monolith 108. At the same time, valve 98 is opened so that air pump 50 may supply air through distribution pipes 52 and injection tubes 54 to exhaust ports 42. In this manner oxidation of hydrocarbons and carbon monoxide is continued in exhaust manifold 48a, which thus serves as an exhaust manifold reactor, while at the same time monolith 108 begins to cool.

In some circumstances, air valves 98 may be replaced simply by orifices; in that case, all flow from air pump 50 would be delivered through distribution pipes 52 and injection tubes 54 to exhaust ports 42 when air valves 100 are closed, as in the warm-up and reactor modes, and flow from air pump 50 would be proportioned between distribution pipes 52 and converter pipes 102 when air valves 100 are open, as in the converter mode.

It will be recalled that rapid heating of the inlet manifold permits early leaning of the carburetion from the very rich air-fuel mixtures required while starting and warming the engine to the mixtures required for subsequent operation. However, the mixtures required for converter operation also are richer than stoichiometric because a reducing atmosphere is required in the reducing portion of the converter unit. On the other hand, such rich mixtures may not be required when operating in the reactor mode. It is proposed, therefore, that provision be included in carburetor 20 for switching from the rich mixtures required during the converter mode of operation to leaner mixtures during the reactor mode of operation. The leaner air-fuel mixtures will enhance fuel economy, reduce the amount of combustible material delivered to the exhaust manifolds, and assist in providing the oxidizing atmosphere required for efficient control of hydrocarbons and carbon monoxide. While specific mechanism for switching from rich to lean operation has not been depicted, those skilled in the art will recognize that this may be accomplished by appropriate control of customary or special air bleeds, fuel jets, and/or metering rods.

Further, when switching from the converter mode of operation with the associated rich air-fuel mixtures to the reactor mode of operation with the associated leaner air-fuel mixtures, it may be desirable to adjust ignition timing for optimum combustion. This may be achieved, as one example, by appropriate control of vacuum advance and vacuum retard signals which generally are utilized to operate the distributor vacuum motors for control of ignition timing.

It also should be recognized that switching of the carburetor to lean air-fuel mixtures during the reactor mode may thereby provide sufficient air in exhaust manifold plenum 56 to sustain an oxidation reaction without addition of air by pump 50. Such would permit disengagement of the air pump drive during the reactor mode of operation with a resultant reduction in engine load.

In some circumstances, the manifold heat valves also may be replaced simply by orifices; in that case, a substantial portion of the exhaust gas flow would be delivered through crossover passages 34 and 36 during the warm-up mode, and a lesser portion of the exhaust gas flow — determined by the sizes of the orifices — would be delivered through the crossover passages during the converter and reactor modes.

In circumstances where the carburetor must provide very rich air-fuel mixtures for effective exhaust gas treatment in the converter mode, extremely rapid heating of the inlet manifold may not be required, and converter valve 62a then may be eliminated. In that case, all of the exhaust gas flow would be directed through converter unit 82a during the warm-up and converter modes when reactor valve 124 is closed, and most of the exhaust gas flow would avoid the converter unit during the reactor mode when reactor valve 124 is open.

FIGS. 6 through 9 show various alternative converter units which may be used in place of converter unit 82a shown in FIG. 5. It will be appreciated that while FIGS. 6 through 9 do not show provision for the passage 78a and manifold heat valve 76a, these may be incorporated as shown in FIG. 5.

Figure 6:
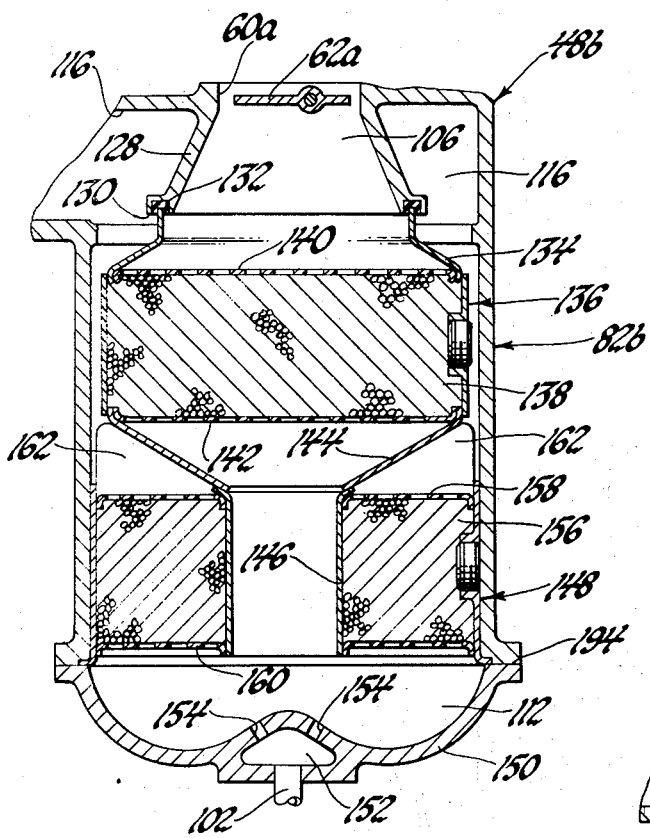
FIGS. 6 through 9 are views of alternative converter units which may be used in place of that shown in the FIG. 5 embodiment.

Referring to the FIG. 6 embodiment wherein the exhaust manifold 48b is similar to exhaust manifold 48a of the FIG. 5 embodiment excepting the aforementioned provision for passage 78a, opening 60a extends from the exhaust plenum (not shown) to the upper region 106 of converter unit 82b. In a manner similar to the embodiment of FIG. 5 but shown in greater detail in FIG. 5, the conical partition 128 surrounding upper region 106 has a downwardly facing channel 130.

Received within channel 130 and bedded therein by a sealing material 132, a conical sheet metal member 134 directs exhaust gases from upper region 106 into a reducing bed 136, shown here as a bed of catalyst beads 138 retained between upper and lower perforated sheet metal members 140 and 142. Another conical sheet metal member 144 directs exhaust gases from bed 136 into a tubular member 146 leading through an oxidizing bed 148 into lower region 112 of converter unit 82b.

In a manner similar to the FIG. 5 embodiment, a bottom plate 150 for converter unit 82b receives air from pipe 102 in a plenum 152 from which it is discharged through a plurality of apertures 154 into lower region 112 for mixture with the exhaust gases.

The mixture of exhaust gases and air then passes upwardly through oxidizing bed 148, shown here as a bed of catalyst beads 156 retained between upper and lower perforated sheet metal members 158 and 160. From bed 148 the exhaust gases flow about reducing bed 136 and then into discharge plenum 116.

It is noted that a plurality of vertical fins 162 may be used to reinforce the structure if desired.

It will be appreciated that air could be introduced from plenum 152 through a tube into the regions defined by conical and/or tubular members 144 and 146 as an alternative, or in addition, to introduction of air into lower region 112 through apertures 154.

Figure 7:
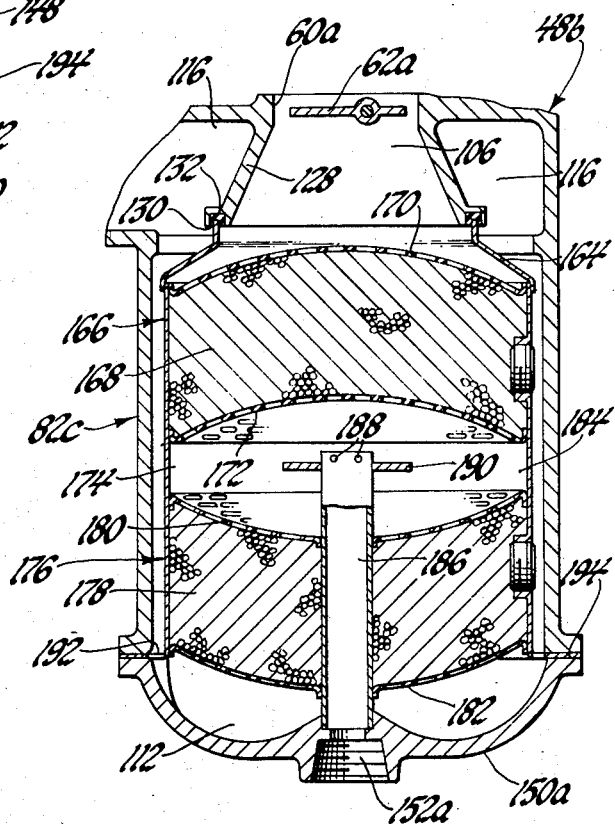

Referring to the FIG. 7 embodiment wherein the exhaust manifold 48b is similar to that shown in FIG. 6, a conical sheet metal member 164 directs exhaust gases from upper region 106 into a reducing bed 166, shown here as a bed of catalyst beads 168 retained between domed upper and lower perforated sheet metal members 170 and 172. A tube 174 directs exhaust gases from reducing bed 166 to an oxidizing bed 176, shown here as a bed of catalyst beads 178 also retained between domed upper and lower perforated sheet metal members 180 and 182.

A chamber 184 is defined within tube 174 between the lower member 172 of reducing bed 166 and the upper member 180 of oxidizing bed 176. To provide an oxidizing atmosphere in oxidizing bed 176, air is supplied to chamber 184 through a tube 186 received in the air plenum 152a of the bottom plate 150a. The upper end of tube 186 has a plurality of lateral apertures 188 discharging above a radially extending baffle plate 190 designed to disperse and mix the air with the exhaust gases.

Catalyst beds 166 and 176 may be supported on a plurality of ledges 192 formed in bottom plate 150a. From bed 176, the exhaust gases flow about ledges 192 and then upwardly around catalyst beds 176 and 166 to discharge plenum 116.

Figures 8, 9:
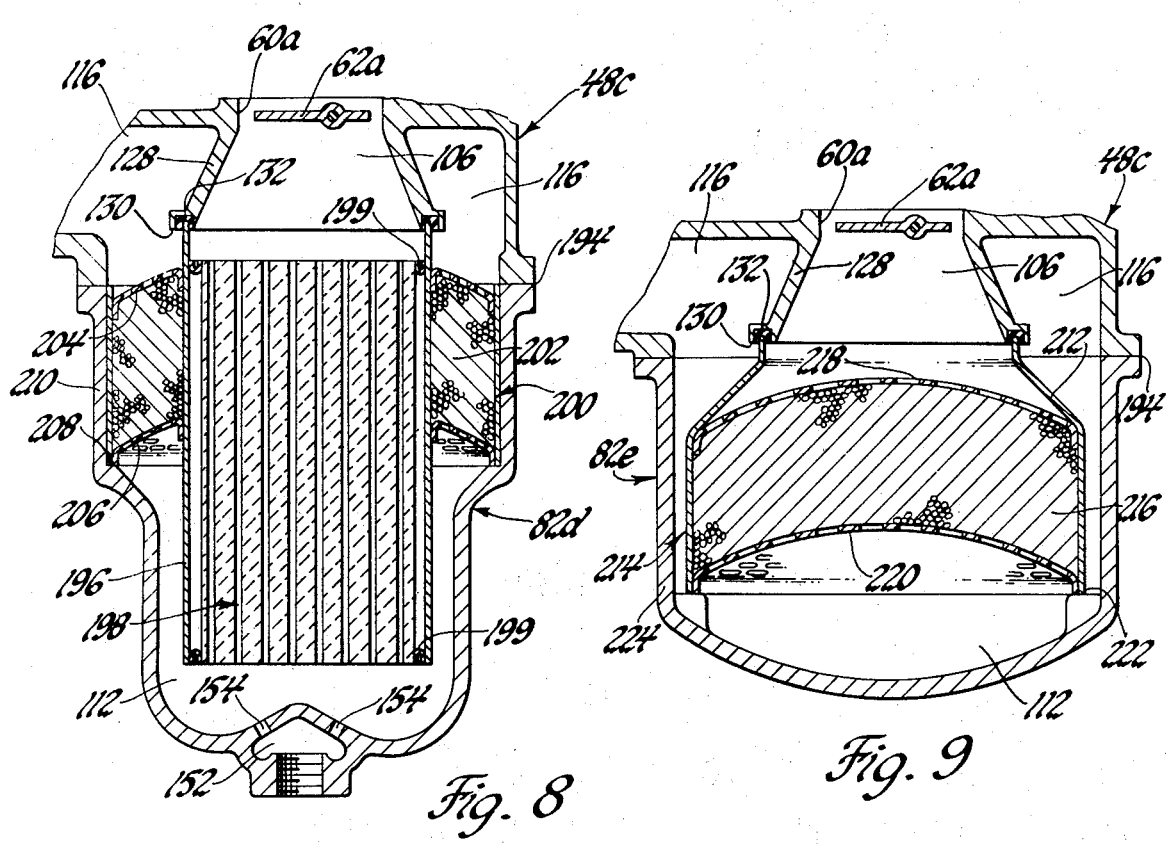

Referring to the FIG. 8 embodiment, exhaust manifold 48c is similar to exhaust manifold 48b of the FIG. 6 and 7 embodiments except that a parting line 194 has been provided near the top of converter unit 82d rather than near the bottom.

A tubular member 196 directs exhaust gases from upper region 106 into a reducing bed 198 shown here as a monolithic catalyst element. As one method of supporting element 198 in tubular member 196, a resilient annular clip 199 is located about each end of element 198 and exerts a slight radial force which retains the element against axial motion in the tube.

The exhaust gases are discharged from bed 198 into lower region 112 and there are mixed with air supplied from air plenum 152 through apertures 154. The mixture of air and exhaust gases then passes upwardly about bed 198 into an oxidizing bed 200, shown here as a bed of catalyst beads 202 retained between domed upper and lower perforated sheet metal members 204 and 206 and supported on a peripheral shoulder 208 formed in a housing 210. The exhaust gases are discharged from bed 200 directly into discharge plenum 116.

FIG. 9 shows an embodiment employing only one catalyst bed. In this embodiment, exhaust manifold 48c is identical to that of the FIG. 8 embodiment. A conical sheet metal member 212 directs exhaust gases from upper region 106 into a catalyst bed 214, shown here as a bed of catalyst beads 216 retained between domed upper and lower perforated sheet metal members 218 and 220 and supported on a plurality of ledges 222 formed in housing 224. The exhaust gases are discharged from bed 214 into lower region 112 and then flow between ledges 222 and pass upwardly about bed 214 to discharge plenum 116. As shown, catalyst bed 214 is an oxidizing bed, and an oxidizing atmosphere is provided by air injected at the combustion chamber exhaust ports 42.

It will be appreciated that each of the FIG. 4 through 8 embodiments may utilize the three mode method of operation: In the warm-up mode, air is injected at the exhaust ports to support an oxidation reaction which promotes heating of the catalyst. During the converter mode, a rich mixture provides a reducing atmosphere in a reducing portion of the converter unit and air is added below the reducing portion to provide an oxidizing atmosphere in the oxidizing portion of the converter unit. In the reactor mode, an oxidation reaction is sustained in the exhaust manifolds while the exhaust gases avoid the converter units to protect the catalyst.

The FIG. 9 embodiment also employs this multiple mode method of operation, the warm-up mode blending into the converter mode because there is no need to reduce air flow to exhaust ports 42 to provide a reducing atmosphere in the converter unit.

Figure 10:
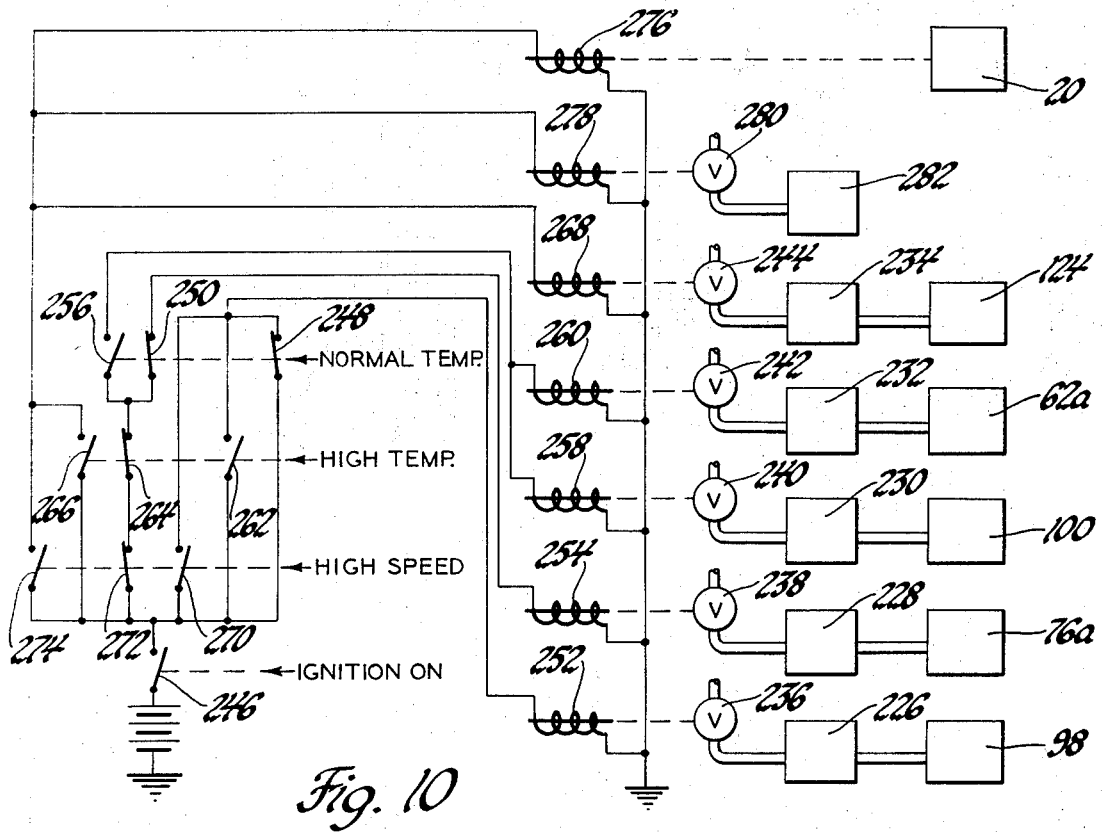
FIG. 10 is a diagram illustrating schematically a system for operating the valves of the FIG. 5 embodiment.

FIG. 10 schematically illustrates a system for operating the valves of the FIG. 5 embodiment. As shown, air valve 98, manifold heat valve 76a, air valve 100, converter valve 62a, and reactor valve 124 are opened by vacuum motors 226, 228, 230, 232, 234 respectively which receive vacuum when valves 236, 238, 240, 242, 244 respectively are opened. In operation, after the ignition switch 246 has been closed and during the warm-up mode, switches 248 and 250 are closed to energize solenoids 252 and 254 which open valves 236 and 238 to in turn open air valve 98 and manifold heat valve 76a. When normal operating temperatures are reached, the converter mode is entered by opening switches 248 and 250 to in turn close air valve 98 and manifold heat valve 76a and by closing a switch 256 to energize solenoids 258 and 260 which open valves 240 and 242 to in turn open air valve 100 and converter valve 62a. Under high temperature conditions, the reactor mode is entered by closing a switch 262 to energize solenoid 252 to in turn open air valve 98, by opening a switch 264 to deenergize solenoids 254, 258 and 260 to in turn close manifold heat valve 76a, air valve 100, and converter valve 62a, and by closing a switch 266 to energize a solenoid 268 which opens valve 244 to in turn open reactor valve 124. Similarly, under high speed conditions, the reactor mode is entered by closing a switch 270 to energize solenoid 252 to in turn open air valve 98, by opening a switch 272 to deenergize solenoids 254, 258, and 260 to close manifold heat valve 76a, air valve 100, and converter valve 62a, and by closing a switch 274 to energize solenoid 268 to in turn open reactor valve 124.

As also shown in FIG. 10, a pair of relays 276 and 278 may be disposed in series or in parallel with reactor valve relay 268. Solenoid 276 may control an air bleed, a fuel jet, or a metering rod in carburetor 20 to provide a leaner air-fuel mixture during the reactor mode, and solenoid 278 may operate a valve 280 which controls the vacuum supplied to a distributor vacuum motor 282 for advancing or retarding the ignition timing as necessary during the reactor mode.

It will be appreciated, of course, that many other control approaches may be adopted for these valves.

From the foregoing, it will be appreciated that this invention provides an internal combustion engine and a method of operation for exhaust emission control which permits a number of exhaust emission control concepts to be combined in an advantageous manner while simultaneously permitting extensive flexibility for selection of the concepts which are necessary in each particular situation.

We claim:

1. The method of operating an internal combustion engine having a combustion chamber issuing exhaust gases through an exhaust port, an exhaust manifold receiving the exhaust gases from said exhaust port, a converter unit receiving the exhaust gases from said manifold and including a reducing portion containing a catalyst bed adapted to promote dissociation of exhaust gas oxides of nitrogen in a reducing atmosphere and an oxidizing portion for oxidation of exhaust gas hydrocarbons and carbon monoxide in an oxidizing atmosphere, and an exhaust pipe receiving the exhaust gases from said manifold and said converter unit, said method comprising the steps of:

during one condition of operation, utilizing a converter mode including the substeps of:
directing the exhaust gases to pass from said manifold in series through said reducing and oxidizing portions of said converter unit to said exhaust pipe,
providing a reducing atmosphere in said reducing portion whereby exhaust gas oxides of nitrogen are dissociated,
and injecting air into the exhaust gases leaving said reducing portion to provide an oxidizing atmosphere in said oxidizing portion whereby exhaust gas hydrocarbons and carbon monoxide are oxidized,
and during another condition of operation, utilizing a reactor mode including the substeps of:
permitting the exhaust gases to pass from said manifold directly to said exhaust pipe,
and providing an oxidizing atmosphere in said manifold to promote oxidation of exhaust gas hydrocarbons and carbon monoxide therein.

2. An internal combustion engine comprising a combustion chamber having an exhaust port and issuing exhaust gases therefrom, an exhaust manifold receiving exhaust gases from said exhaust port, a converter unit receiving exhaust gases from said manifold and including a catalyst bed adapted to promote dissociation of exhaust gas oxides of nitrogen in a reducing atmosphere, an exhaust pipe receiving exhaust gases from said manifold and said converter unit, valve means for directing exhaust gases to flow from said manifold through said catalyst bed to said exhaust pipe under one condition of operation and for permitting exhaust gases to flow from said manifold directly to said exhaust pipe under another condition of operation, air delivery means for injecting air into the exhaust gases closely adjacent said exhaust port, and means controlling said air delivery means whereby a reducing atmosphere is maintained in said catalyst bed for dissociation of exhaust gas oxides of nitrogen under said one condition of operation and whereby an oxidizing atmosphere is maintained in said manifold for oxidation of exhaust gas hydrocarbon and carbon monoxide under said other condition of operation.

3. An internal combustion engine comprising a combustion chamber having an exhaust port and issuing exhaust gases therefrom, an exhaust manifold receiving exhaust gases from said exhaust port, a converter unit including means for receiving exhaust gases from said manifold and a catalyst bed having a reducing portion adapted to promote dissociation of exhaust gas oxides of nitrogen in a reducing atmosphere and an oxidizing portion adapted to promote oxidation of exhaust gas hydrocarbons and carbon monoxide in an oxidizing atmosphere, an exhaust pipe receiving exhaust gases from said exhaust manifold and said converter unit, valve means having a converter position for directing exhaust gases to pass from said manifold through said reducing and oxidizing portions of said catalyst bed to said exhaust pipe and having a reactor position for permitting exhaust gases to pass from said manifold directly to said exhaust pipe, atmosphere control means having a converter position for providing a reducing atmosphere in said manifold and having a reactor position for providing an oxidizing atmosphere in said manifold, converter air delivery means for injecting air into the exhaust gases in said converter unit between said reducing and oxidizing portions of said catalyst bed to provide an oxidizing atmosphere in said oxidizing portion of said catalyst bed, and temperature and speed responsive means for positioning said valve means and said atmosphere control means in said converter positions at temperatures and speeds below certain levels and for positioning said valve means and said atmosphere control means in said reactor positions at temperatures or speeds above said certain levels, whereby at temperatures and speeds below said certain levels a converter mode is entered in which the exhaust gases pass in a reducing atmosphere through said reducing portion of said catalyst bed for dissociation of oxides of nitrogen, and then pass in an oxidizing atmosphere through said oxidizing portion of said catalyst bed for oxidation of hydrocarbons and carbon monoxide, and whereby at temperatures or speeds above said certain levels a reactor mode is entered in which the exhaust gases pass in an oxidizing atmosphere through said manifold for oxidation of hydrocarbons and carbon monoxide and then are permitted to pass from said manifold directly to said exhaust pipe to protect said catalyst bed.

4. The method of operating an internal combustion engine having a combustion chamber issuing exhaust gases through an exhaust port, an exhaust manifold receiving the exhaust gases from said exhaust port, a converter unit receiving the exhaust gases from said manifold and including a reducing portion containing a catalyst bed adapted to promote dissociation of exhaust gas oxides of nitrogen in a reducing atmosphere and an oxidizing portion for oxidation of exhaust gas hydrocarbons and carbon monoxide in an oxidizing atmosphere, and an exhaust pipe receiving the exhaust gases from said manifold and said converter unit, said method comprising the steps of:

during operating temperatures below a certain level, utilizing a converter mode including the substeps of:
directing the exhaust gases to pass from said manifold in series through said reducing and oxidizing portions of said converter unit to said exhaust pipe,
providing a reducing atmosphere in said reducing portion whereby exhaust gas oxides of nitrogen are dissociated,
and injecting air into the exhaust gases leaving said reducing portion to provide an oxidizing atmosphere in said oxidizing portion whereby exhaust gas hydrocarbons and carbon monoxide are oxidized,
and during operating temperatures above said certain level, utilizing a reactor mode including the substeps of:
permitting the exhaust gases to pass from said manifold directly to said exhaust pipe,
and providing an oxidizing atmosphere in said manifold to promote oxidation of exhaust gas hydrocarbons and carbon monoxide therein.

5. The method of operating an internal combustion engine having a combustion chamber issuing exhaust gases through an exhaust port, an exhaust manifold receiving the exhaust gases from said exhaust port, a converter unit receiving the exhaust gases from said manifold and including a reducing portion containing a catalyst bed adapted to promote dissociation of exhaust gas oxides of nitrogen in a reducing atmosphere and an oxidizing portion for oxidation of exhaust gas hydrocarbons and carbon monoxide in an oxidizing atmosphere, and an exhaust pipe receiving the exhaust gases from said manifold and said converter unit, said method comprising the steps of:

during operating speeds below a certain level, utilizing a converter mode including the substeps of:
directing the exhaust gases to pass from said manifold in series through said reducing and oxidizing portions of said converter unit to said exhaust pipe,
providing a reducing atmosphere in said reducing portion whereby exhaust gas oxides of nitrogen are dissociated,
and injecting air into the exhaust gases leaving said reducing portion to provide an oxidizing atmosphere in said oxidizing portion whereby exhaust gas hydrocarbons and carbon monoxide are oxidized,
and during operating speeds above said certain level, utilizing a reactor mode including the substeps of:

permitting the exhaust gases to pass from said manifold directly to said exhaust pipe,
and providing an oxidizing atmosphere in said manifold to promote oxidation of exhaust gas hydrocarbons and carbon monoxide therein.

6. The method of operating an internal combustion engine having a combustion chamber issuing exhaust gases through an exhaust port, an exhaust manifold receiving the exhaust gases from said exhaust port, a converter unit receiving the exhaust gases from said manifold and including a reducing portion containing a catalyst bed adapted to promote dissociation of exhaust gas oxides of nitrogen in a reducing atmosphere and an oxidizing portion for oxidation of exhaust gas hydrocarbons and carbon monoxide in an oxidizing atmosphere, and an exhaust pipe receiving the exhaust gases from said manifold and said converter unit, said method comprising the steps of:

during low temperature operation, utilizing a warm-up mode including the substeps of:
directing the exhaust gases to pass from said manifold through said converter unit to said exhaust pipe,
and injecting air into the exhaust gases closely adjacent said combustion chamber exhaust port to support oxidation of exhaust gas hydrocarbons and carbon monoxide in said exhaust manifold and said converter unit whereby heat released during said oxidation reaction may promote heating of said converter unit,
during one condition of operation subsequent to said low temperature operation, utilizing a converter mode including the substeps of:
directing the exhaust gases to pass from said manifold in series through said reducing and oxidizing portions of said converter unit to said exhaust pipe,
providing a reducing atmosphere in said reducing portion whereby exhaust gas oxides of nitrogen are dissociated,
and injecting air into the exhaust gases leaving said reducing portion to provide an oxidizing atmosphere in said oxidizing portion whereby exhaust gas hydrocarbons and carbon monoxide are oxidized, and during another condition of operation subsequent to said low temperature operation, utilizing a reactor mode including the substeps of:
  permitting the exhaust gases to pass from said manifold directly to said exhaust pipe,
  and providing an oxidizing atmosphere in said manifold to promote oxidation of exhaust gas hydrocarbons and carbon monoxide therein.

7. The method of operating an internal combustion engine having a combustion chamber issuing exhaust gases through an exhaust port, an exhaust manifold receiving the exhaust gases from said exhaust port, a converter unit receiving the exhaust gases from said manifold and including a reducing portion containing a catalyst bed adapted to promote dissociation of exhaust gas oxides of nitrogen in a reducing atmosphere and an oxidizing portion for oxidation of exhaust gas hydrocarbons and carbon monoxide in an oxidizing atmosphere, an exhaust pipe receiving the exhaust gases from said manifold and said converter unit, and an induction system for delivering an air-fuel mixture to said combustion chamber, said method comprising the steps of:
  during low temperature operation, utilizing a warm-up mode including the substeps of:
    directing the exhaust gases to pass from said manifold through said converter unit to said exhaust pipe,
    injecting air into the exhaust gases closely adjacent said combustion chamber exhaust port to support oxidation of exhaust gas hydrocarbons and carbon monoxide in said exhaust manifold and said converter unit whereby heat released during said oxidation reaction may promote heating of said converter unit,
    and directing exhaust gases to pass in heat exchange relationship with said induction system whereby heat released during said oxidation reaction may promote evaporation of the fuel in the air-fuel mixture,
  during one condition of operation subsequent to said low temperature operation, utilizing a converter mode including the substeps of:
    directing the exhaust gases to pass from said manifold in series through said reducing and oxidizing portions of said converter unit to said exhaust pipe,
    providing a reducing atmosphere in said reducing portion whereby exhaust gas oxides of nitrogen are dissociated,
    and injecting air into the exhaust gases leaving said reducing portion to provide an oxidizing atmosphere in said oxidizing portion whereby exhaust gas hydrocarbons and carbon monoxide are oxidized,
  and during another condition of operation subsequent to said low temperature operation, utilizing a reactor mode including the substeps of:
    permitting the exhaust gases to pass from said manifold directly to said exhaust pipe,
    and providing an oxidizing atmosphere in said manifold to promote oxidation of exhaust gas hydrocarbons and carbon monoxide therein.

8. The method of operating an internal combustion engine having a combustion chamber issuing exhaust gases through an exhaust port, an exhaust manifold receiving the exhaust gases from said exhaust port, a converter unit receiving the exhaust gases from said manifold and including a reducing portion containing a catalyst bed adapted to promote dissociation of exhaust gas oxides of nitrogen in a reducing atmosphere and an oxidizing portion for oxidation of exhaust gas hydrocarbons and carbon monoxide in an oxidizing atmosphere, an exhaust pipe receiving the exhaust gases from said manifold and said converter unit, and an induction system for delivering an air-fuel mixture to said combustion chamber, said method comprising the steps of:
  during low temperature operation, utilizing a warm-up mode including the substeps of:
    injecting air into the exhaust gases closely adjacent said combustion chamber exhaust port to support oxidation of exhaust gas hydrocarbons and carbon monoxide,
    directing the exhaust gases to pass in heat exchange relationship with said induction system whereby heat released during said oxidation reaction may promote evaporation of the fuel in the air-fuel mixture,
    and thereafter directing the exhaust gases to pass through said converter unit to said exhaust pipe whereby heat released during said oxidation reaction may promote heating of said converter unit,
  during one condition of operation subsequent to said low temperature operation, utilizing a converter mode including the substeps of:
    directing the exhaust gases to pass from said manifold in series through said reducing and oxidizing portions of said converter unit to said exhaust pipe,
    providing a reducing atmosphere in said reducing portion whereby exhaust gas oxides of nitrogen are dissociated,
    and injecting air into the exhaust gases leaving said reducing portion to provide an oxidizing atmosphere in said oxidizing portion whereby exhaust gas hydrocarbons and carbon monoxide are oxidized,
  and during another condition of operation subsequent to said low temperature operation, utilizing a reactor mode including the substeps of:
    permitting the exhaust gases to pass from said manifold directly to said exhaust pipe,
    and providing an oxidizing atmosphere in said manifold to promote oxidation of exhaust gas hydrocarbons and carbon monoxide therein.

9. The method of operating an internal combustion engine having a combustion chamber issuing exhaust gases through an exhaust port, an exhaust manifold receiving the exhaust gases from said exhaust port, a converter unit receiving the exhaust gases from said manifold and including a reducing portion containing a catalyst bed adapted to promote dissociation of exhaust gas oxides of nitrogen in a reducing atmosphere and an oxidizing portion for oxidation of exhaust gas hydrocarbons and carbon monoxide in an oxidizing atmosphere and an exhaust pipe receiving the exhaust gases from said manifold and said converter unit, said method comprising the steps of:
  during one condition of operation, utilizing a converter mode including the substeps of:
    directing the exhaust gases to pass from said manifold in series through said reducing and oxidizing portions of said converter unit to said exhaust pipe, delivering richer than stoichiometric air-fuel mixtures to said combustion chamber to provide a reducing atmosphere in said reducing portion whereby exhaust gas oxides of nitrogen are dissociated, and injecting air into the exhaust gases leaving said reducing portion to provide an oxidizing atmosphere in said oxidizing portion whereby exhaust gas hydrocarbons and carbon monoxide are oxidized, and during another condition of operation, utilizing a reactor mode including the substeps of:
permitting the exhaust gases to pass from said manifold directly to said exhaust pipe,
and delivering leaner than stoichiometric air-fuel mixtures to said combustion chamber to provide an oxidizing atmosphere in said manifold to promote oxidation of exhaust gas hydrocarbons and carbon monoxide therein.

10. The method of operating an internal combustion engine having a combustion chamber issuing exhaust gases through an exhaust port, an exhaust manifold receiving the exhaust gases from said exhaust port, a converter unit receiving the exhaust gases from said manifold and including a reducing portion containing a catalyst bed adapted to promote dissociation of exhaust gas oxides of nitrogen in a reducing atmosphere and an oxidizing portion for oxidation of exhaust gas hydrocarbons and carbon monoxide in an oxidizing atmosphere, and an exhaust pipe receiving the exhaust gases from said manifold and said converter unit, said method comprising the steps of:

during one condition of operation, utilizing a converter mode including the substeps of:
directing the exhaust gases to pass from said manifold in series through said reducing and oxidizing portions of said converter unit to said exhaust pipe,
providing a reducing atmosphere in said reducing portion whereby exhaust gas oxides of nitrogen are dissociated,
and injecting air into the exhaust gases leaving said reducing portion to provide an oxidizing atmosphere in said oxidizing portion whereby exhaust gas hydrocarbons and carbon monoxide are oxidized, and during another condition of operation, utilizing a reactor mode including the substeps of:
permitting the exhaust gases to pass from said manifold directly to said exhaust pipe,
and injecting air into the exhaust gases closely adjacent said combustion chamber exhaust port to thereby provide an oxidizing atmosphere in said manifold to promote oxidation of exhaust gas hydrocarbons and carbon monoxide therein.

11. The method of operating an internal combustion engine having a combustion chamber issuing exhaust gases through an exhaust port, an exhaust manifold receiving the exhaust gases from said exhaust port, a converter unit receiving the exhaust gases from said manifold and including a catalyst bed adapted to promote dissociation of exhaust gas oxides of nitrogen in a reducing atmosphere, and an exhaust pipe receiving the exhaust gases from said manifold and said converter unit, said method comprising the steps of:

during operating speeds below a certain level, utilizing a converter mode including the substeps of directing the exhaust gases to pass from said manifold through said catalyst bed to said exhaust pipe and providing a reducing atmosphere in said catalyst bed whereby oxides of nitrogen are dissociated, and during operating speeds above said certain level, utilizing a reactor mode including the substeps of permitting the exhaust gases to pass from said manifold directly to said exhaust pipe and providing an oxidizing atmosphere in said manifold to support oxidation of exhaust gas hydrocarbons and carbon monoxide therein while protecting said catalyst bed.

12. The method of operating an internal combustion engine having a combustion chamber issuing exhaust gases through an exhaust port, an exhaust manifold receiving the exhaust gases from said exhaust port, a converter unit receiving the exhaust gases from said manifold and including a catalyst bed having a reducing portion adapted to promote dissocation of exhaust gas oxides of nitrogen in a reducing atmosphere and an oxidizing portion adapted to promote oxidation of exhaust gas hydrocarbons and carbon monoxide in an oxidizing atmosphere, and an exhaust pipe receiving the exhaust gases from said manifold and said converter unit, said method comprising the steps of:

during operating speeds below a certain level, utilizing a converter mode including the substeps of directing the exhaust gases to pass from said manifold sequentially through said reducing portion and said oxidizing portion of atmosphere catalyst bed to said exhaust pipe, providing a reducing atmosphere in said reducing portion whereby exhaust gas oxides of nitrogen are dissociated, and providing an oxidizing atmosphere in said oxidizing portion whereby exhaust gas hydrocarbons and carbon monoxide are oxidized, and during operating speeds above said certain level, utilizing a reactor mode including the substeps of permitting the exhaust gases to pass from said manifold directly to said exhaust pipe and providing an oxidizing atmosphere in said manifold to support oxidation of exhaust gas hydrocarbons and carbon monoxide therein while protecting said catalyst bed.

13. An internal combustion engine comprising a combustion chamber having an exhaust port and issuing exhaust gases therefrom, an exhaust manifold receiving exhaust gases from said exhaust port, a converter unit receiving exhaust gases from said manifold and including a catalyst bed adapted to promote dissociation of exhaust gas oxides of nitrogen in a reducing atmosphere, an exhaust pipe receiving exhaust gases from said manifold and said converter unit, valve means for directing exhaust gases to flow from said manifold through said catalyst bed to said exhaust pipe under one condition of operation and for permitting exhaust gases to flow from said manifold directly to said exhaust pipe under another condition of operation, air delivery means for injecting air into the exhaust gases closely adjacent said exhaust port and for injecting air into the exhaust gases in said converter unit downstream of said catalyst bed, and means controlling said air delivery means whereby a reducing atmosphere is maintained in said catalyst bed for dissociation of exhaust gas oxides of nitrogen and an oxidizing atmosphere is maintained in said converter unit downstream of said catalyst bed for oxidation of exhaust gas hydrocarbons and carbon monoxide under said one condition of operation and whereby an oxidizing atmosphere is maintained in said manifold for oxidation of exhaust gas hydrocarbons and carbon monoxide under said other condition of operation.

14. An internal combustion engine comprising a combustion chamber having an exhaust port and issuing exhaust gases therefrom, an exhaust manifold receiving exhaust gases from said exhaust port, a converter unit receiving exhaust gases from said manifold and including a first catalyst bed adapted to promote dissociation of exhaust gas oxides of nitrogen in a reducing atmosphere and a second catalyst bed adapted to promote oxidation of exhaust gas hydrocarbons and carbon monoxide in an oxidizing atmosphere disposed downstream of said first catalyst bed, an exhaust pipe receiving exhaust gases from said manifold and said converter unit, valve means for directing exhaust gases to flow from said manifold through said converter unit to said exhaust pipe under one condition of operation and for permitting exhaust gases to flow from said manifold directly to said exhaust pipe under another condition of operation, air delivery means for injecting air into the exhaust gases closely adjacent said exhaust port and for injecting air into the exhaust gases in said converter unit between said first and second catalyst beds, means controlling said air delivery means whereby a reducing atmosphere is maintained in said first catalyst bed for dissociation of exhaust gas oxides of nitrogen and an oxidizing atmosphere is maintained in said second catalyst bed for oxidation of exhaust gas hydrocarbons and carbon monoxide under said one condition of operation and whereby an oxidizing atmosphere is maintained in said manifold for oxidation of exhaust gas hydrocarbon and carbon monoxide under said other condition of operation.

15. An internal combustion engine comprising a combustion chamber having an exhaust port and issuing exhaust gases therefrom, an exhaust manifold receiving exhaust gases from said exhaust port, a converter unit receiving exhaust gases from said manifold and including a catalyst bed adapted to promote dissociation of exhaust gas oxides of nitrogen in a reducing atmosphere, an exhaust pipe receiving exhaust gases from said manifold and said converter unit, valve means for directing exhaust gases to flow from said manifold through said catalyst bed to said exhaust pipe during operating temperatures below a certain level and for permitting exhaust gases to flow from said manifold directly to said exhaust pipe during operating temperatures above said certain level, air delivery means for injecting air into the exhaust gases closely adjacent said exhaust port, and means controlling said air delivery means whereby a reducing atmosphere is maintained in said catalyst bed for dissociation of exhaust gas oxides of nitrogen during operating temperatures below said certain level and whereby an oxidizing atmosphere is maintained in said manifold for oxidation of exhaust gas hydrocarbon and carbon monoxide during operating temperatures above said certain level.

16. An internal combustion engine comprising a combustion chamber having an exhaust port and issuing exhaust gases therefrom, an exhaust manifold receiving exhaust gases from said exhaust port, a converter unit receiving exhaust gases from said manifold and including a catalyst bed adapted to promote dissociation of exhaust gas oxides of nitrogen in a reducing atmosphere, an exhaust pipe receiving exhaust gases from said manifold and said converter unit, valve means for directing exhaust gases to flow from said manifold through said catalyst bed to said exhaust pipe during operating speeds below a certain level and for permitting exhaust gases to flow from said manifold directly to said exhaust pipe during operating speeds above said certain level, air delivery means for injecting air into the exhaust gases closely adjacent said exhaust port, and means controlling said air delivery means whereby a reducing atmosphere is maintained in said catalyst bed for dissociation of exhaust gas oxides of nitrogen during operating speeds below said certain level and whereby an oxidizing atmosphere is maintained in said manifold for oxidation of exhaust gas hydrocarbon and carbon monoxide during operating speeds above said certain level.

17. An internal combustion engine comprising a combustion chamber having an exhaust port and issuing exhaust gases therefrom, an exhaust manifold receiving exhaust gases from said exhaust port, a converter unit including means for receiving exhaust gases from said manifold and a catalyst bed having a reducing portion adapted to promote dissociation of exhaust gas oxides of nitrogen in a reducing atmosphere and an oxidizing portion adapted to promote oxidation of exhaust gas hydrocarbons and carbon monoxide in an oxidizing atmosphere, an exhaust pipe receiving exhaust gases from said exhaust manifold and said converter unit, valve means having a converter position for directing exhaust gases to pass from said manifold through said reducing and oxidizing portions of said catalyst bed to said exhaust pipe and having a reactor position for permitting exhaust gases to pass from said manifold directly to said exhaust pipe, atmosphere control means having a converter position for providing a reducing atmosphere in said manifold and having a reactor position for providing an oxidizing atmosphere in said manifold, converter air delivery means for injecting air into the exhaust gases in said converter unit between said reducing and oxidizing portions of said catalyst bed to provide an oxidizing atmosphere in said oxidizing portion of said catalyst bed, temperature and speed responsive means for positioning said valve means and said atmosphere control means in said converter positions at temperatures and speeds below certain levels and for positioning said valve means and said atmosphere control means in said reactor positions at temperatures or speeds above said certain levels, whereby at temperatures and speeds below said certain levels a converter mode is entered in which the exhaust gases pass in a reducing atmosphere through said reducing portion of said catalyst bed for dissociation of oxides of nitrogen, and then pass in an oxidizing atmosphere through said oxidizing portion of said catalyst bed for oxidation of hydrocarbons and carbon monoxide, and whereby at temperatures or speeds above said certain levels a reactor mode is entered in which the exhaust gases pass in an oxidizing atmosphere through said manifold for oxidation of hydrocarbons and carbon monoxide and then are permitted to pass from said manifold directly to said exhaust pipe to protect said catalyst bed, and exhaust port air delivery means for injecting air into the exhaust gases closely adjacent said exhaust port, air delivery control means having a warm-up position for providing air flow through said exhaust port air delivery means at a rate sufficient to provide an oxidizing atmosphere in said manifold and having a converter position for limiting air flow through said exhaust port air delivery means to a rate insufficient to provide an oxidizing atmosphere in said manifold when said atmosphere control means is in said converter position, and means for positioning said air delivery control means in said warm-up position during a certain period immediately after the engine is started and for positioning said air delivery control means in said converter position at the conclusion of said period, whereby immediately after the engine is started a warm-up mode is entered in which the exhaust gases pass in an oxidizing atmosphere through said manifold for oxidation of hydrocarbons and carbon monoxide and then pass through and heat said catalyst bed, and whereby at the conclusion of said period said converter mode is entered.

18. An internal combustion engine comprising a combustion chamber having an exhaust port and issuing exhaust gases therefrom in a reducing atmosphere, an exhaust manifold receiving exhaust gases from said exhaust port, a converter unit including means for receiving exhaust gases from said manifold and a catalyst bed having a reducing portion adapted to promote dissociation of exhaust gas oxides of nitrogen in a reducing atmosphere and an oxidizing portion adapted to promote oxidation of exhaust gas hydrocarbons and carbon monoxide in an oxidizing atmosphere, an exhaust pipe receiving exhaust gases from said exhaust manifold and said converter unit, valve means having a converter position for directing exhaust gases to pass from said manifold through said reducing and oxidizing portions of said catalyst bed to said exhaust pipe and having a reactor position for permitting exhaust gases to pass from said manifold directly to said exhaust pipe, converter air delivery means for injecting air into the exhaust gases in said converter unit between said reducing and oxidizing portion of said catalyst bed to provide an oxidizing atmosphere in said oxidizing portion of said catalyst bed, exhaust port air delivery means for injecting air into the exhaust gases closely adjacent said exhaust port, air delivery control means having a converter position for limiting air flow through said exhaust port air delivery means to a rate insufficient to provide an oxidizing atmosphere in said manifold and having a reactor position for providing air flow through said exhaust port air delivery means at a rate sufficient to provide an oxidizing atmosphere in said manifold, and temperature and speed responsive means for positioning said valve means and said air delivery control means in said converter positions at temperatures and speeds below certain levels and for positioning said valve means and said air delivery control means in said reactor positions at temperatures or speeds above said certain levels, whereby at temperatures and speeds below said certain levels a converter mode is entered in which the exhaust gases pass in a reducing atmosphere through said reducing portion of said catalyst bed for dissociation of oxides of nitrogen, and then pass in an oxidizing atmosphere through said oxidizing portion of said catalyst bed for oxidation of hydrocarbons and carbon monoxide, and whereby at temperatures or speeds above said certain levels a reactor mode is entered in which the exhaust gases pass in an oxidizing atmosphere through said manifold for oxidation of hydrocarbons and carbon monoxide and then are permitted to pass from said manifold directly to said exhaust pipe to protect said catalyst bed.

19. An internal combustion engine comprising a combustion chamber having an exhaust port and issuing exhaust gases therefrom in a reducing atmosphere, an exhaust manifold receiving exhaust gases from said exhaust port, a converter unit including means for receiving exhaust gases from said manifold and a catalyst bed having a reducing portion adapted to promote dissociation of exhaust gas oxides of nitrogen in a reducing atmosphere and an oxidizing portion adapted to promote oxidation of exhaust gas hydrocarbons and carbon monoxide in an oxidizing atmosphere, an exhaust pipe receiving exhaust gases from said exhaust manifold and said converter unit, valve means having a converter position for directing exhaust gases to pass from said manifold through said reducing and oxidizing portions of said catalyst bed to said exhaust pipe and having a reactor position for permitting exhaust gases to pass from said manifold directly to said exhaust pipe, converter air delivery means for injecting air into the exhaust gases in said converter unit between said reducing and oxidizing portions of said catalyst bed to provide an oxidizing atmosphere in said oxidizing portion of said catalyst bed, exhaust port air delivery means for injecting air into the exhaust gases closely adjacent said exhaust port, air delivery control means having a converter position for limiting air flow through said exhaust port air delivery means to a rate insufficient to provide an oxidizing atmosphere in said manifold and having a reactor position for providing air flow through said exhaust port air delivery means at a rate sufficient to provide an oxidizing atmosphere in said manifold, means for positioning said air delivery control means in said reactor position during a warm-up period immediately after the engine is started and for positioning said air delivery control means in said converter position at the conclusion of said warm-up period, whereby during said warm-up period a warm-up mode is entered in which the exhaust gases pass in an oxidizing atmosphere through said manifold for oxidation of hydrocarbons and carbon monoxide and then pass through and heat said catalyst bed, and temperature and speed responsive means for positioning said valve means and said air delivery control means in said converter positions at temperatures and speeds below certain levels after said warm-up period and for positioning said valve means and said air delivery control means in said reactor positions at temperatures or speeds above said certain levels after said warm-up period, whereby at temperatures and speeds below said certain levels after said warm-up period a converter mode is entered in which the exhaust gases pass in a reducing atmosphere through said reducing portion of said catalyst bed for dissociation of oxides of nitrogen, and then pass in an oxidizing atmosphere through said oxidizing portion of said catalyst bed for oxidation of hydrocarbons and carbon monoxide, and whereby at temperatures or speeds above said certain levels during and after said warm-up period a reactor mode is entered in which the exhaust gases pass in an oxidizing atmosphere through said manifold for oxidation of hydrocarbons and carbon monoxide and then are permitted to pass from said manifold directly to said exhaust pipe to protect said catalyst bed.

20. An internal combustion engine comprising a combustion chamber having an exhaust port and issuing exhaust gases therefrom in a reducing atmosphere, an induction passage for delivering an air-fuel mixture to said combustion chamber, a heat exchange region disposed in heat exchange relation with said induction passage, said heat exchange region receiving exhaust gases from said exhaust port whereby the exhaust gases may promote evaporation of the fuel in the air-fuel mixture, an exhaust manifold receiving exhaust gases from said exhaust port, a converter unit including means for receiving exhaust gases from said manifold and said heat exchange region and a catalyst bed having a reducing portion adapted to promote dissociation of exhaust gas oxides of nitrogen in a reducing atmosphere and an oxidizing portion adapted to promote oxidation of exhaust gas hydrocarbons and carbon monoxide in an oxidizing atmosphere, an exhaust pipe receiving exhaust gases from said exhaust manifold and said converter unit, valve means having a converter position for directing exhaust gases to pass from said manifold through said reducing and oxidizing portions of said catalyst bed to said exhaust pipe and having a reactor position for permitting exhaust gases to pass from said manifold directly to said exhaust pipe, converter air delivery means for injecting air into the exhaust gases in said converter unit between said reducing and oxidizing portions of said catalyst bed to provide an oxidizing atmosphere in said oxidizing portion of said catalyst bed, exhaust port air delivery means for injecting air into the exhaust gases closely adjacent said exhaust port, air delivery control means having a converter position for limiting air flow through said exhaust port air delivery means to a rate insufficient to provide an oxidizing atmosphere in said manifold and having a reactor position for providing air flow through said exhaust port air delivery means at a rate sufficient to provide an oxidizing atmosphere in said manifold, means for positioning said air delivery control means in said reactor position during a warm-up period immediately after the engine is started and for positioning said air delivery control means in said converter position at the conclusion of said warm-up period, whereby during said warm-up period a warm-up mode is entered in which the exhaust gases pass in an oxidizing atmosphere through said manifold for oxidation of hydrocarbons and carbon monoxide and then pass through and heat said catalyst bed, and temperature and speed responsive means for positioning said valve means and said air delivery control means in said converter positions at temperatures and speeds below certain levels after said warm-up period and for positioning said valve means and said air delivery control means in said reactor positions at temperatures or speeds above said certain levels during and after said warm-up period, whereby at temperatures and speeds below said certain levels after said warm-up period a converter mode is entered in which the exhaust gases pass in a reducing atmosphere through said reducing portion of said catalyst bed for dissociation of oxides of nitrogen, and the pass in an oxidizing atmosphere through said oxidizing portion of said catalyst bed for oxidation of hydrocarbons and carbon monoxide, and whereby at temperatures or speeds above said certain levels during and after said warm-up period a reactor mode is entered in which the exhaust gases pass in an oxidizing atmosphere through said manifold for oxidation of hydrocarbons and carbon monoxide and then are permitted to pass from said manifold directly to said exhaust pipe to protect said catalyst bed.

21. An internal combustion engine comprising a combustion chamber having an exhaust port and issuing exhaust gases therefrom in a reducing atmosphere, an induction passage for delivering an air-fuel mixture to said combustion chamber, a heat exchange region disposed in heat exchange relation with said induction passage, said heat exchange region receiving exhaust gases from said exhaust port whereby the exhaust gases may promote evaporation of the fuel in the air-fuel mixture, an exhaust manifold receiving exhaust gases from said exhaust port, a converter unit including means for receiving exhaust gases from said manifold and said heat exchange region and a catalyst bed having a reducing portion adapted to promote dissociation of exhaust gas oxides of nitrogen in a reducing atmosphere and an oxidizing portion adapted to promote oxidation of exhaust gas hydrocarbons and carbon monoxide in an oxidizing atmosphere, an exhaust pipe receiving exhaust gases from said exhaust manifold and said converter unit, valve means having an induction passage heating position for directing the exhaust gases to pass from said exhaust port into said heat exchange region, having a converter position for permitting exhaust gases to pass from said manifold through said reducing and oxidizing portions of said catalyst bed to said exhaust pipe, and having a reactor position for permitting exhaust gases to pass from said manifold directly to said exhaust pipe, converter air delivery means for injecting air into the exhaust gases in said converter unit between said reducing and oxidizing portions of said catalyst bed to provide an oxidizing atmosphere in said oxidizing portion of said catalyst bed, exhaust port air delivery means for injecting air into the exhaust gases closely adjacent said exhaust port, air delivery control means having a converter position for limiting air flow through said exhaust port air delivery means to a rate insufficient to provide an oxidizing atmosphere in said manifold and having a reactor position for providing air flow through said exhaust port air delivery means at a rate sufficient to provide an oxidizing atmosphere in said manifold, and temperature and speed responsive means for positioning said valve means in said induction passage heating position and said air delivery control means in said reactor position during a warm-up period immediately after the engine is started, for positioning said valve means and said air delivery control means in said converter positions at temperatures and speeds below certain levels after said warm-up period, and for positioning said valve means and said air delivery control means in said reactor positions at temperatures or speeds above said certain levels during and after said warm-up period, whereby during said warm-up period a warm-up mode is entered in which the exhaust gases pass in an oxidizing atmosphere through said manifold for oxidation of hydrocarbons and carbon monoxide and then pass through and heat said heat exchange region and said catalyst bed, whereby at temperatures and speeds below said certain levels after said warm-up period a converter mode is entered in which the exhaust gases pass in a reducing atmosphere through said reducing portion of said catalyst bed for dissociation of oxides of nitrogen, and then pass in an oxidizing atmosphere through said oxidizing portion of said catalyst bed for oxidation of hydrocarbons and carbon monoxide, and whereby at temperatures or speeds above said certain levels during and after said warm-up period a reactor mode is entered in which the exhaust gases pass in an oxidizing atmosphere through said manifold for oxidation of hydrocarbons and carbon monoxide and then are permitted to pass from said manifold directly to said exhaust pipe to protect said catalyst bed.

* * * * *